UNITED STATES PATENT OFFICE.

PAUL SEIDEL, OF LUDWIGSHAFEN, GERMANY, ASSIGNOR TO BADISCHE ANILIN & SODA FABRIK, OF LUDWIGSHAFEN, GERMANY, A CORPORATION.

PROCESS OF MAKING INDIGO FROM INDOL.

SPECIFICATION forming part of Letters Patent No. 698,328, dated April 22, 1902.

Application filed September 24, 1901. Serial No. 76,430. (No specimens.)

*To all whom it may concern:*

Be it known that I, PAUL SEIDEL, doctor of philosophy and chemist, a subject of the King of Saxony, residing at Ludwigshafen-on-the-Rhine, in the Kingdom of Bavaria, Germany, have invented new and useful Improvements in the Manufacture of Indigo from Indol, of which the following is a specification.

Many attempts have been made to obtain indigo from indol (see Nencki, *Berichte*, volume 8, page 727; Engler and Janecke, *Berichte*, volume 9, page 1414; Ladenburg, *Berichte*, volume 10, page 1131) by treating it with a variety of oxidizing agents, but only very small quantities of indigo could be obtained. I have discovered that indol can be converted into indigo by treatment with "Caro's reagent," (so named by Baeyer in *Berichte*, volume 32, page 3625, and also called "sulfo-mono-peracid" by Baeyer in *Berichte*, volume 33, page 2480,) which can be obtained from potassium persulfate and concentrated sulfuric acid, as described by Caro in *Zeitschrift für Angewandte Chemie* for 1898, page 845, or from hydrogen peroxid and sulfuric acid, as described by Baeyer in *Berichte*, volume 33, page 124. I have also discovered that oxygen which has been rendered active by such means as sulfite of soda or of bisulfite of soda (Wicke in *Zeitschrift für Chemie* for 1865, pages 80 and 305; Jorissen in *Zeitschrift für Physikalische Chemie*, volume 23, page 667) is an equivalent for converting indol into indigo.

The following examples will serve to further illustrate the nature of my invention and the manner in which the same may be carried into practical effect; but the invention is not confined to the examples. The parts are by weight.

Example 1: Grind together five (5) parts of indol and twenty (20) parts of water to a fine paste and add to this a solution of Caro's reagent, obtained from twenty-five (25) parts of potassium persulfate and twenty-eight (28) parts of concentrated sulfuric acid, (containing about ninety-five per cent. of $H_2SO_4$,) diluted by the addition of one thousand (1,000) parts of ice. The solution at once turns yellow and then becomes dark. Allow it to stand for one (1) hour, filter, and purify the indigo which separates out by boiling with alcohol. A red coloring-matter, soluble in alcohol, dissolves and pure indigo remains.

Example 2: Take Caro's reagent, obtained as stated in the foregoing Example 1, and neutralize it by adding an aqueous solution of forty (40) parts of calcined soda. Add this solution to a solution of ten (10) parts of indol in five thousand (5,000) parts of water and add also sufficient dilute caustic-soda solution to give the liquid an alkaline reaction. After a short time the indigo separates out.

Example 3: Dissolve about five (5) parts of indol in three thousand (3,000) parts of water and add to the solution ten (10) parts of sodium sulfite dissolved in fifty (50) parts of water. On standing in the air the solution assumes a greenish fluorescence. This takes place sooner if air be blown through the liquid. Add an alkali to the liquid and allow it to stand exposed to the air or blow air through the liquid, when the indigo produced separates out.

Example 4: Dissolve about five (5) parts of indol in three thousand (3,000) parts of water and to the solution add fifty (50) parts of commercial sodium-bisulfite solution, (containing about forty per cent. of real bisulfite.) Allow the solution to stand exposed to the air or blow through it. Indigo begins to separate out. Add caustic soda to the solution and continue to blow air through it and a further quantity of indigo separates out.

Example 5: Mix together ten (10) parts of indol bisulfite as prepared by Hesse (see *Berichte*, volume 32, page 2615) and ten (10) parts of commercial sodium-bisulfite solution (containing about forty per cent. of real bisulfite) and five hundred (500) parts of water and treat the mixture with air, when indigo separates out. Add caustic soda until the reaction is alkaline and again pass air into the mixture, when a further quantity of indigo is obtained.

Now what I claim is—

5 The process of manufacturing indigo which consists in treating indol with sulfo-monoperacid.

In testimony whereof I have hereunto set my hand in the presence of two subscribing witnesses.

PAUL SEIDEL.

Witnesses:
JOHN L. HEINKE,
JACOB ADRIAN.